J. C. WILLIAMSON.
CLUTCH FOR STUMP PULLERS.
APPLICATION FILED FEB. 25, 1911.
1,012,309.
Patented Dec. 19, 1911.
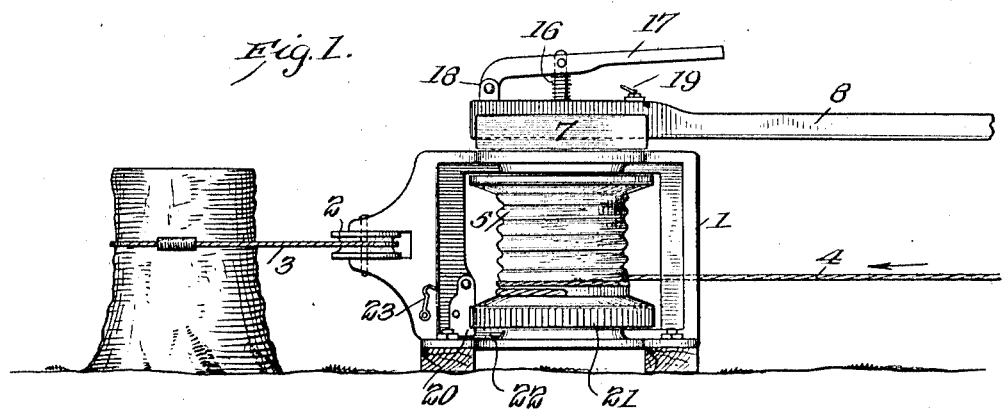
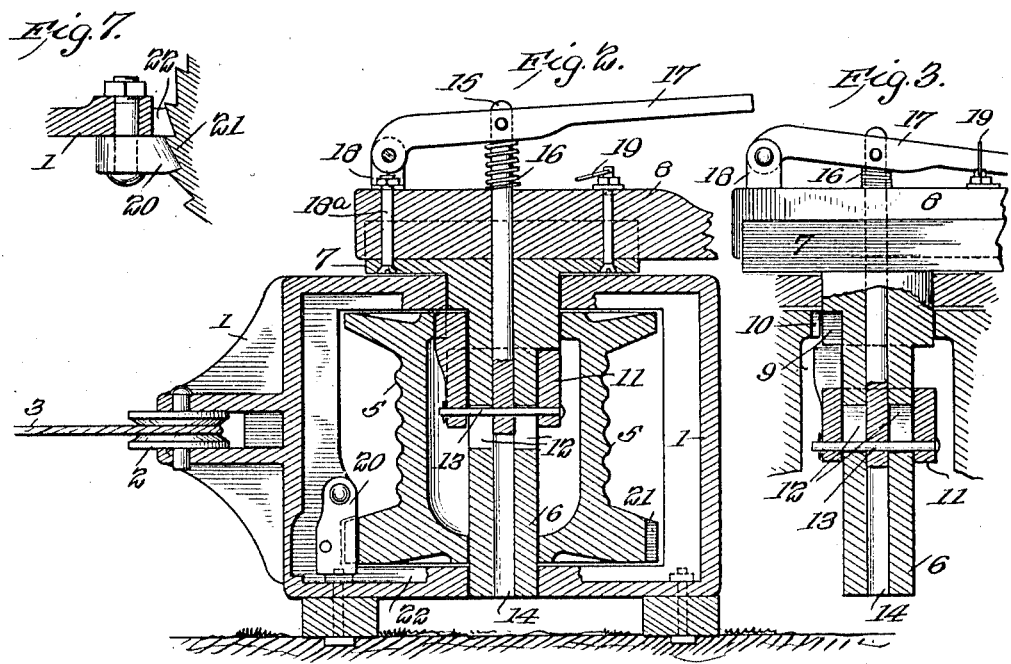
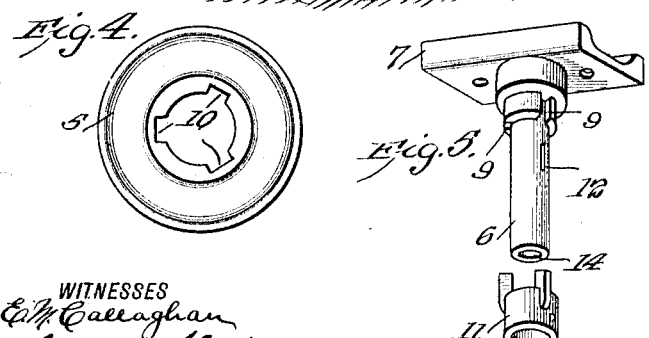
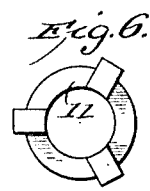
WITNESSES
INVENTOR
JAMES C. WILLIAMSON
BY
ATTORNEYS

UNITED STATES PATENT OFFICE.

JAMES CLARENCE WILLIAMSON, OF DUDLEY, GEORGIA.

CLUTCH FOR STUMP-PULLERS.

1,012,309.   Specification of Letters Patent.   Patented Dec. 19, 1911.

Application filed February 25, 1911. Serial No. 610,667.

*To all whom it may concern:*

Be it known that I, JAMES CLARENCE WILLIAMSON, a citizen of the United States, and a resident of Dudley, in the county of Laurens and State of Georgia, have invented certain Improvements in Clutches for Stump-Pullers, of which the following is a specification.

My invention is an improvement in clutches for that class of stump-pullers in which a cable is wound on a rotatable drum having a sweep or long lever to which a team may be hitched. The qualities most desired in such machines are maximum lightness, strength, and power with adaptation for convenient and practically instantaneous locking or release of the winding drum with relation to the sweep shaft. I attain these and other advantages by the construction, arrangement, and combination of parts hereinafter described and claimed, and which are illustrated in the accompanying drawing, in which—

Figure 1 is a side elevation of my improved stump-puller as in operation. Fig. 2 is a central vertical section of the machine, the drum being shown locked with the sweep shaft. Fig. 3 is in part a sectional view showing the drum unlocked from the sweep shaft. Fig. 4 is a plan view of the winding drum. Fig. 5 is a perspective view including the sweep shaft, its head, and the clutch by which it may be locked with the drum. Fig. 6 is an enlarged plan view of a sleeve half clutch which is slidable on the sweep shaft. Fig. 7 is a detail horizontal section illustrating the arrangement of a locking dog and its coaction with the ratchet base of the drum.

The frame 1 of the machine is constructed with special reference to a combination of maximum lightness and strength. At one end it is provided with a pulley 2, around which passes a rope 3 that, in practice, is attached to a stump as an anchor. A cable 4 is attached to a flanged drum 5 and adapted to be wound thereon. The drum is mounted detachably upon a shaft 6 having the usual flanged head 7 to which a sweep 8 is attached. The said shaft is journaled in coincident vertical openings in the frame 1, and its upper portion is enlarged, thus forming a circular boss which fills the opening in the frame and extends somewhat below it, and is provided with a series of sockets or notches 9—see Fig. 3. The top of the drum 5 is also provided with a similar series of notches 10, which are so spaced that, when the drum is duly adjusted, they coincide with the notches 9 of the shaft boss.

Within the chamber of the drum I arrange a sleeve half-clutch 11 which is provided with three teeth corresponding in form and position with the notches 9 and 10 above referred to. This sleeve clutch is adapted to slide on the reduced portion of the shaft 6, and the latter is provided with transverse slots 12 through which passes a pin 13 whose ends also pass through the sleeve 11. The shaft 6 is provided with a central, longitudinal bore 14, and in this a slidable rod 15 is arranged, the same extending out through the sweep head 8 and being there provided with a spiral expansion spring 16. The latter is arranged between the butt of the sweep and a hand lever 17, which is pivoted to the rod and also fulcrumed on a bracket 18 forming an attachment of one of the bolts 18$^a$ which secures the sweep butt to the shaft-head. A catch 19 is applied to the shaft in such position that it may be readily engaged with the lever 17 when the latter is depressed, as shown in Fig. 3. It will now be understood that, when the lever is free, the spring 16 forces the rod 15 upward, so that the sleeve half-clutch 11 is drawn into engagement with the half-clutch 9 forming an attachment of the shaft boss, and also into the notches 10 of the drum-head, as shown in Fig. 2. When the parts are thus locked together, the drum may be rotated and the cable taken up as the team passes around the machine.

At one side of the frame 1 is arranged a dog 20, which, as shown in Figs. 1, 2, and 7, is pivoted in such manner as to hang normally vertical, and in such position it engages the ratchet teeth 21 formed on the lower flange of the drum. The body of the dog lies flat against the adjacent portion of the frame and its lower end also bears against a rib 22 forming a part of the base of the frame. The dog is thus adapted to resist great pressure, but may be readily thrown and held out of action by means of a hook 23—see Fig. 1. It will be further apparent that, when it is desired to release the drum from engagement with the shaft 6, the lever 17 is depressed and engaged by the catch 19, as in Fig. 3, whereby the sleeve half-clutch 11 is carried down into such position that its lugs or teeth are drawn out of engagement with the corresponding notches 9 and 10 of the shaft boss and drum. It is apparent that the locking and releasing engagement may be easily, and practically instantaneously, effected by operation of the lever, that is to say, by its release from or engagement with the catch 19. When disengaged from the catch, the spring 16 automatically reëngages the clutch and holds it engaged until the lever shall be again depressed by positive action on the part of the operator.

By the arrangement of the sleeve clutch 11 in the chamber of the drum and by its construction to encircle the drum shaft, it is not only protected from contact with exterior objects, but it is very strong yet may be easily operated for locking or unlocking the drum.

One of the prominent advantages of improved construction and combination of parts may be stated as follows. In the operation of the machine, it frequently happens that the cable reaches the highest point on the drum and when the tension is very great it is difficult for the team to pass the cable. In such case, the team is stopped and backed a little which allows the drum to lock with the dog 20 which, of course, releases the clutch from the pressure and consequent friction which previously held it too firmly engaged with the drum to be released therefrom. While the drum is thus held by the dog, the sleeve clutch 11 may be slid down on the drum shaft without difficulty and then the team may be driven across or past the cable, when, the clutch being reëngaged, the winding operation is begun anew. This same adaptation for convenient operation of the clutch and release of the drum is also important when it is required to draw the cable off the drum, as when applying it to a stump that is to be pulled, or for other purpose. In other words, by depressing and locking the lever 17, the clutch is disengaged, and the dog 20 being held retracted, the drum may be freely rotated on the shaft, so that drawing off the cable is an easy operation. Such freedom of the drum for rotation independently of a clutch confers a great advantage over machines in which the shaft head is provided with a half or ratchet clutch and is adapted to engage a corresponding half clutch on the drum, since in such case the weight of the shaft head and sweep is mainly imposed on the drum.

A practical advantage in operation and an economy in use of the machine is effected by providing the pulley 2 in place of a hook for attachment of the anchor rope 3, since it prevents rapid wear of the latter which would otherwise occur in shifting the machine around the anchor as required for pulling stumps at different points. The pulley may be readily detached by reason of the fact that its pivot is removable, so that the application and removal of the anchor rope 3 is easily effected. The pulley is arranged in a slot formed in the projecting end portion of the frame 1 and the pin passes vertically through both jaws or portions of the frame on opposite sides of the slots.

What I claim is:—

The improved clutch mechanism for stump-pullers, comprising a frame, a vertical shaft having an enlarged upper portion or boss provided with notches and also constructed with a central bore and transverse slots, a winding ratchet drum applied to such shaft within the frame, and provided at its head with a series of notches spaced apart corresponding to the notches of the shaft boss, a sleeve half-clutch encircling the shaft and slidable on its reduced portion and having teeth adapted to engage the notches of the shaft boss and the drum head, a rod which is slidable in the central bore of the shaft, a cross-pin passing through the same, and also through the sleeve clutch and the shaft slots, a lever pivoted to the head of the shaft and also to the aforesaid rod, an expansion spring applied to the rod, as described.

JAMES CLARENCE WILLIAMSON.

Witnesses:
SOLON C. KEMON,
AMOS W. HART.